June 27, 1967        J. C. KUZARA        3,327,470
SETTING MECHANISM FOR MENSTRUAL CYCLE INDICATOR
Filed Aug. 23, 1965
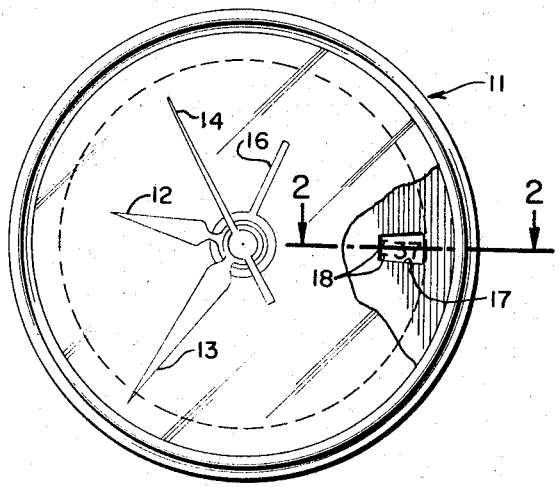
FIG. 1
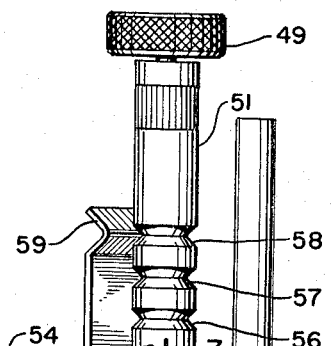
FIG. 2
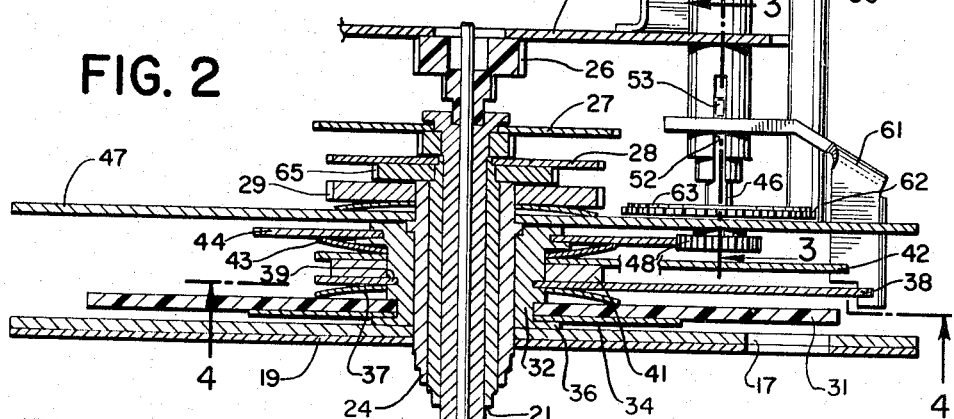
FIG. 4
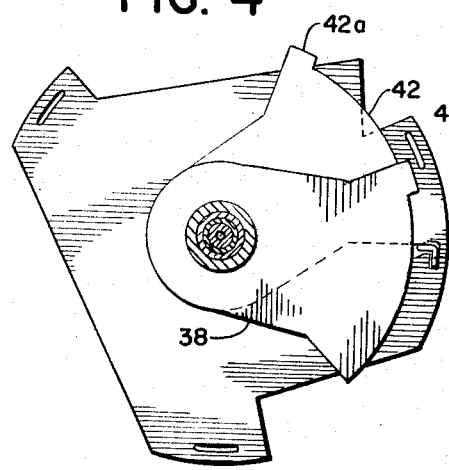
FIG. 3
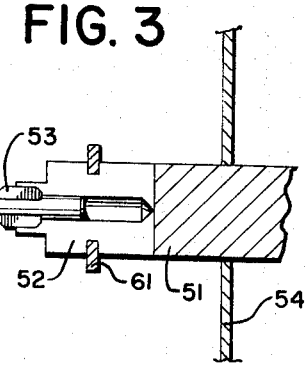
INVENTOR.
JOHN C. KUZARA
BY
ATTORNEY

United States Patent Office 3,327,470
Patented June 27, 1967

3,327,470
SETTING MECHANISM FOR MENSTRUAL
CYCLE INDICATOR
John C. Kuzara, 6 Nachilly Drive,
New Britain, Conn. 06053
Filed Aug. 23, 1965, Ser. No. 481,863
4 Claims. (Cl. 58—4)

This invention relates to a timing mechanism for indicating a period of time in advance of a future event, and in particular it relates to a clock for determining the time of expected maximum fertility of a woman during her menstrual cycle.

It has been medically well established that woman of childbearing age can most easily become pregnant at or about the time of ovulation during each menstural cycle and that ovulation takes place approximately fourteen days before the next menses. However, the length of the menstrual cycle may vary from time to time so that it is difficult to determine with any precision the fourteenth day before the onset of the next menses.

Various devices have been contrived to keep track of the duration and expected termination of each menstrual cycle with a view to the determination of the precise interval in which ovulation is most likely to occur. Reliability of operation is of critical importance in such devices and therefore it is desirable that the indicator be attached to and operated by an electric clock, as in the case of the apparatus described in Gordon Patent No. 2,979,884. The present invention simplifies the setting procedures of the Gordon mechanism in order to eliminate, as nearly as possible every potential source of human error.

It is a principal object of this invention to provide a menstrual cycle indicating mechanism having a simplified setting structure. Other objects are to provide such a mechanism with a setting structure having only one control to set the fertility interval indicating means and to set the indicator on the first day of each menstrual period. Still further objects will become apparent after studying the following specifications, which is to be read in conjunction with the drawings in which:

FIG. 1 shows the face of a clock incorporating menstrual cycle indicating apparatus according to this invention;

FIG. 2 is a cross-sectional view of the indicating portion of the clock mechanism;

FIG. 3 is a cross-sectional view of the setting control of the mechanism of FIG. 2; and FIG. 4 is a plan view of the flags in FIG. 2.

The clock face 11 in FIG. 1 may have any suitable construction and is provided with time indicators in the form of an hour hand 12, a minute hand 13, and a second hand 14. The clock is also commonly provided with an alarm mechanism and an alarm indicating hand 16.

The only feature to distinguish the face of the clock 11 from any ordinary clock is a window 17 through which the numbers of an indicator are visible. In the embodiment shown, the numeral 37 is visible through the window 17 and, at the left hand edge of the window 17 are several short lines 18 indicating fractional periods of time. The indicator measures days of the menstrual cycle, rather than absolute calendar days, and is connected to the clock mechanism so that it moves one number for each two complete revolutions of the hour hand 12. The short lines 18 are spaced to indicate one-fourth day intervals, although they may be omitted or spaced differently.

FIG. 2 shows the basic part of the indicating mechanism that must be added to the standard clock to provide the menstrual cycle indications required for determination of the period of maximum fertility. Of necessity part of the basic clock mechanism is shown including a dial 19, including a plurality of co-axial shafts to operate the various hands. These include a shaft 21 to operate the hour hand 12, a shaft 22 to operate the minute hand 13, and a shaft 23 to operate the second hand 14. Surrounding the shaft 21 is a hollow shaft 24 to which the alarm indicator 16 is attached. These shafts are all actuated by standard clock mechanisms which therefore need not be shown in complete detail since they do not form any part of the present invention. The second hand shaft 23 is operated by a gear 26 which is connected to a motor. The minute hand shaft 22 has a gear 27 connected by means of a gear reduction mechanism to the gear 26 to be operated thereby, and the hour shaft 21, in turn, has a gear 28 that is connected by means of a further gear reduction to the gear 27 to be operated thereby at a reduced speed. The alarm indicator hand shaft 24 has a gear 29 that is connected to a setting mechanism to actuate an alarm at the proper time.

The menstrual cycle indicator mechanism includes a transparent indicator wheel 31 mounted on a hollow shaft 32 that is rotated at a speed very much slower than that of the hour hand 12. The indicator 31 is provided with a series of equally spaced numerals from 1 to 40 in the region immediately behind the window 17, as indicated in FIG. 1, and is held on the shaft 32 between a shoulder 33 and a washer 34, which, in turn, is held in place by a staking flange 36 on the end of the shaft 32. The indicator 31 is free to rotate on the shaft 32 but is normally prevented from doing so because of friction between the indicator and the washer 34 and the staking flange 36. The pressure that produces this frictional engagement is achieved by means of a wave washer 37 compressed between the indicator 31 and a first means to indicate a sub-group of the numbers on the indicator 31. This first means is a flag 38, usually of colored material, which is held within a groove 39 in the hollow shaft 32 but is free to turn with respect to the shaft. However the pressure of the wave washer 37 on the front surface of the flag 38 normally prevents it from turning with respect to the indicator 31, with the result that both of these members rotate together and in step with the rotation of shaft 32. A washer 41 surrounds the shaft 32 immediately behind the flag 38 to form an additional frictional surface in contact with the rear surface of the flag 38. The rear surface of the washer 41 is in contact with a second indicating means in the form of a second flag 42, also mounted on the shaft 32. The second flag 42 is normally prevented from turning with respect to the shaft 32 by means of a second wave washer 43 which bears upon the rear surface of the flag 42 and upon the front surface of a gear 44 non-rotatably affixed to the shaft 32. Because of the rigid coupling between the gear 44 and the shaft 32, the shaft rotates whenever the gear rotates, and because of the wave washers 37 and 43, the flags 38 and 42 normally rotate with the indicator 31 and with the shaft 32 without any relative rotation of any of these members with respect to the others.

For setting purposes, and for driving the gear 44, a shaft 46 is mounted in a plate 47, as shown in both FIGS. 2 and 3. A pinion 48 is non-rotatably attached to the shaft 46 to be rotated thereby, and this pinion is in mesh with the gear 44. The shaft 46 is rotated in two different ways. In the first place, it may be rotated manually by means of a knob 49 operating through an extension shaft 51, the inner end of which is hollow to receive the shaft 46 and is provided with a pair of slots 52 that permit it to slip over a transverse pin 53 extending through the shaft 46 or formed on the surface thereof so as to extend outwardly therefrom and into the slot 52. The extension shaft 51 fits sufficiently loosely upon the shaft 46 so that it can easily slide axially thereon. The shaft 51 extends through a plate 54 and is provided with three notches 56–58. These notches act as detents in conjunction with detent spring 59. The extension 51 is shown with the detent spring 59 engaging the detent 58 which is the position for setting both of the flags 38 and 42. When the shaft 51 is pulled back so that the spring 59 engages the detent notch 57, the setting mechanism is positioned for controlling the location of the second flag 42. When the shaft 51 is pulled still further back so that the spring 59 engages the third notch 56, both of the flags 38 and 42 are free to rotate along with the indicator 31. In any of these positions of the detent spring with respect to the three notches 56–58, the knob 49 may be rotated, causing rotation of the shaft 46 and the pinion 48, thereby causing rotation of the gear 44 and the hollow shaft 32.

A stop member 61 is attached to the inner end of the extension shaft 51 to be moved axially therewith. However the stop member fits loosely upon the extension shaft 51 so that it does not rotate therewith but instead extends through an opening in the plate 47 and into the region adjacent the edges of the flags 38 and 42. The relation between the stop member 61 and the flags 38 and 42 will be considered in greater detail hereinafter.

The second way of rotating the pinion 48 is by means of a gear 62 rotatably mounted on the shaft 46. A tension washer 63 engages the rear surface of the gear 62 and normally causes it to rotate the shaft 46 except when sufficient torque is exerted on the knob 49 to overcome the torque produced by the tension washer 63. As indicated by the broken line 64, the gear 62 is driven from a gear 65 rigidly attached to the gear 28 on the hour hand shaft 21 at a slower speed than the hour hand shaft. Except when the flags 38 and 42 are being set, which would only be done at rare intervals, or the indicator 31 is being set, which would be done by the user at the occurrence of each menarche, the knob 49 would not be touched, and the pinion 48 would be driven by the clock mechanism via the gear 65. The step-down ratio between the rotational speed of the hour hand shaft 21 and the pinion 48 in this embodiment is 16:1. The gear ratio of the pinion 48 to the gear 44 is 5:1 in this embodiment, and the overall ratio is therefore 80:1. This means that the indicator 31 has the numbers 1–40 equally spaced around a circle. Very few women have normal menstrual cycles longer than, or even as long as, 40 days.

For a normal menstrual cycle of any uniform periodicity between 22 and 40 days, that is, a cycle in which there is the same number of days between any two successive menses, it has been determined medically that there is an eight day interval of maximum fertility centered around the time of ovulation. For a short cycle of 22 days, this interval starts on the fourth day after the menarche and lasts through the eleventh day; for a so-called "normal" cycle of 28 days, it is the tenth through the seventeenth days; and for a long period of 40 days, it is the twenty-second through the twenty-ninth days.

The menstrual cycles of many women are not uniform; variations of several days are perfectly normal. For example, a women with a menstrual cycle averaging 28 days may have cycles as short as 24 days or as long as 32 days, and it is this variation that is most difficult to keep in mind. The effect of this variation in cycle length is to increase the interval in which the woman must be considered to be fertile. To take the example of a woman whose cycles vary between 24 and 32 days, the interval during which she must be considered to be fertile extends from the sixth through the twenty first days after the menarche.

In order for a woman to operate the menstrual cycle indicator she must first determine the length and variation of her cycles. It is possible to do this by making notations on a calendar even before the indicator is acquired but it is easier to use the indicator itself, merely setting the indicator dial 31 to the number 1 at the beginning of the menses and noting the day appearing in the window 17 at the beginning at the next menses. This should be done for several cycles to obtain information as to the variation in cycle length and it is necessary to keep some record of these variations.

After the length of the cycle has been determined along with the extent of deviations therefrom, the flags 38 and 42 may be set using standard medical tables, which indicate that for a cycle of 22 days, the interval of fertility begins on the fourth day; for a cycle having a minimum length of 23 days, the interval of fertility begins on the fifth day, and so on up through a cycle lasting 40 days, when the interval of fertility begins on the twenty second day. Such tables further indicate that for a cycle lasting as long as 22 days, fertility lasts from the first day of the interval through the eleventh day; for a cycle lasting as long as 24 days, the interval lasts through the twelfth day, and so on through a cycle lasting as long as 40 days when the interval of fertility extends through the twenty ninth day. For a uniform cycle, whether of 22 days, 28 days, or even 40 days, there are only eight days of fertility, whereas for a cycle having a maximum deviation of eight days, whether from 22 to 30 days or from 32 to 40 days, the interval of fertility must be considered to be sixteen days. Thus if each of the flags 38 and 42 covers an interval of eight days, the two of them can accommodate any cycle between 22 and 40 days and any cycle variation up to eight days between those limits. This is the same as saying that the angular width of each of the flags 38 and 42 in the portion thereof immediately behind the numerals on the indicator dial 31 and behind the window 17 must be equivalent to eight of the numbers on the indicator dial 31.

In setting the flags, the knob 49 is first pressed inwardly until the detent 59 shown in FIG. 2 engages the notch 58. If the knob 49 is ten rotated, the pressure of the torque washer 63 will be overcome and the pinion 48 will be driven directly, thus driving the gear 44 and the shaft 32. The shaft 32 carries with it the indicator dial 31 and the two flags 38 and 42. These flags rotate until their leading edges strike the stop 61, at which point both flags cease to rotate, but the indicator dial 31 continues to rotate as long as the knob 49 is rotated. This rotation of the indicator dial 31 by means of the knob 49 is continued until the numeral indicating the first day of the fertility interval of the user's shortest cycle appears. The knob 49 is then drawn back until the detent spring 59 engages the second notch 57, and rotation of the knob is continued in the same direction. Careful observation through the window 17 will show that both the indicator dial 31 and the first flag 38 are rotating. The other flag 42 is also rotating, but it is behind the first flag 38 and will not be visible until the indicator dial 31 and the first flag 38 have rotated eight numbers, corresponding to eight days covered by the first flag. At this point careful observation through the window 17 will reveal that the trailing edge of the first flag is moving past the window and that the second flag is coming into view. The second flag 42 has a tab 42a that catches the end 61a of the stop 61. The end 61a is formed by a notch cut in the stop to clear the perimeter of the flag but not the tab 42a, which extends radially from the circular part of the permieter. At the same time, of course, the numerals on the indiactor dial 31 will also be moving past the window 17, and as the trailing edge of the flag 38 moves past the window, the eighth numeral after the day corresponding to the leading edge of the flag 38 will be passing the window. Thus if the minimum duration of the user's cycle were 25 days, the leading edge of the flag 38 would have been placed opposite the numeral 7 on the indicator dial 31 and the trailing edge of the flag 38 would move past the window 17 at the same time as the numeral 14 on the indicator dial 31. The window 17 would continue to show the second flag 42 as long as the knob 49 was rotated and kept in such a position that the detent spring 59 engaged the notch 57. This would continue until the number indicating the end of the period of fertility of the longest cycle came into view in the window 17. If this were for a cycle of maximum length if 32 days, the number would be 21, and when that number filled the window 17, the knob 49 would be drawn back to such a position that the detent 59 engaged the notch 56. This would complete the setting of the two flags 38 and 42. At this point the flag 38 would indicate a sub-group of numbers corresponding to the numbers 7 through 14 and the flag 42 would indicate a second sub-group of numbers corresponding to thirteen through twenty one. The number 14 would be common to both sub-groups and the flags 38 and 42 would overlap to the extent of this one number.

The knob 49 would be left alone until the start of the next menses, at which time it should simply be rotated, without being pushed inwardly, to bring the numeral 1 in place in the window 17. Thereafter, as the clock mechanism rotates the gear 62, which in turn rotates the shaft 46 and the pinion 48, the shaft 32 will be rotated and carries with it the indicator dial 31 and the flags 38 and 42. For the setting just described, the leading edge of the flag 38 will come into view on the seventh day of the cycle and one or the other of the flags will be visible through the transparent indicator dial 31 from then through the twenty-first day, indicating the period of expected maximum fertility. While the flags 38 and 42 might give an indication of this interval of maximum fertility in any of several ways, the simplest would be for the flags, which are sectors of circles in this embodiment, to have a color, such as red, which could be seen through the window 17 and through the transparent indicator dial 31. The knob 49 must be turned to the numeral 1, without changing the axial position of the knob, at the onset of each menses thereafter. This would be expected to occur between the twenty-sixth and the thirty-third days. If it has to be done earlier than the twenty sixth or if it were delayed beyond the thirty-third, the user would realize that her cycle had changed and should be recalculated.

While this invention has been described in terms of a specific embodiment, modifications may be made therein without departing from the true scope of the invention as defined by the following claims.

What is claimed is:

1. Menstrual indicating mechanism comprising: an indicator having a series of numbers thereon; drive mechanism connected to said indicator to drive the same; first means to indicate a sub-group of numbers on said indicator; a first friction coupling connecting said first means to said drive mechanism to be driven thereby; second means to indicate a sub-group of said numbers on said indicator; a second friction coupling connecting to said first coupling to be driven thereby; a control connected to said drive mechanism to move the same to set said indicator and said first and second means, said control comprising shiftable means having a first position engaging both said first and second means to halt the movement thereof at a pre-determined location, said shiftable means having a second setting position to halt the movement of only said second means to adjust the position thereof relative to said first means whereby the sub-group of numbers indicated by said second means differs, at least partly, from the sub-group of numbers indicated by said first means, said shiftable means having a third position out of engagement with both said first and second means; and first, second, and third detent means engaging said shiftable means in said first, second, and third positions, respectively.

2. The mechanism of claim 1 in which said indicator is in the form of a transparent flat disc and said first means comprises a first flat sector of a disc behind said indicator, and said second means comprises a second sector of a flat disc located behind said first sector and having a tab extending therefrom to be engaged by said shiftable means.

3. The mechanism of claim 2 in which said tab extends substantially radially from the perimeter of said second sector, and said shiftable means has a notch therein fitting over said periphery of said second sector and engaging said tab.

4. Menstrual indicating mechanism comprising: a transparent indicator dial having a series of numbers arranged in a circle thereon; drive mechanism comprising gears and a hollow shaft to which said indicator is attached to be driven; a first sector of a particular color behind and substantially parallel to said dial to indicate a sub-group of numbers on said indicator dial, said sector having a tab extending therefrom adjacent the counterclockwise edge thereof; a first friction coupling connecting said first sector to said drive mechanism to be driven thereby; a second sector of said particular color and substantially behind and substantially parallel to said first sector to indicate a second sub-group of said numbers on said indicator dial, said second sector having only a single tab and said tab being adjacent the counterclockwise edge thereof; a second friction coupling connecting said second sector to said drive mechanism to be driven thereby; and a control connected to said drive mechanism to move the same to set said indicator and said first and second sectors, said control comprising a shaft behind said second sector and axially movable to a first position and a stop extending forwardly from said shaft whereby when said shaft is in said first position said stop engages said tabs on both said first and second sectors to halt the movement of both said sectors at a pre-determined location as said control is rotated, detent means engaging said shaft to retain it in said first position, said control being axially movable to a second setting position in which said stop engages only said tab on said second sector to halt the movement of only said second sector to adjust the position thereof relative to said first sector as said control is rotated, whereby the sub-group of numbers indicated by said second sector differs, at least partly, from the sub-group of numbers indicated by said first sector, a second detent engaging said shaft to hold it in said second position, and said control having a third position in which said stop is clear of both said first and second sectors, a third detent engaging said shaft to hold said shaft in said third position, said second position being more remote from said sectors than said first position and said third position being more remote from said sectors than said second position.

References Cited
UNITED STATES PATENTS 3,255,581   6/1966   Gordon _____ 58—4

RICHARD B. WILKINSON, *Primary Examiner.*

G. F. BAKER, *Assistant Examiner.*